(12) United States Patent
Lee

(10) Patent No.: US 9,439,200 B2
(45) Date of Patent: Sep. 6, 2016

(54) RESOURCE ALLOCATION IN WIRELESS COMMUNICATION

(71) Applicant: Empire Technology Development LLC, Wilmington, DE (US)

(72) Inventor: Hyoung-Gon Lee, Gyeonggi-do (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 136 days.

(21) Appl. No.: 14/130,018

(22) PCT Filed: Jul. 16, 2013

(86) PCT No.: PCT/US2013/050625
§ 371 (c)(1),
(2) Date: Dec. 30, 2013

(87) PCT Pub. No.: WO2015/009282
PCT Pub. Date: Jan. 22, 2015

(65) Prior Publication Data
US 2015/0023257 A1    Jan. 22, 2015

(51) Int. Cl.
*H04W 72/04*    (2009.01)

(52) U.S. Cl.
CPC ....... *H04W 72/048* (2013.01); *H04W 72/0453* (2013.01)

(58) Field of Classification Search
None
See application file for complete search history.

(56) References Cited

U.S. PATENT DOCUMENTS

| 7,099,673 | B2 | 8/2006 | Yamashita | |
| 8,184,586 | B2 * | 5/2012 | Watanabe et al. | 370/330 |
| 8,284,726 | B2 | 10/2012 | Suh et al. | |
| 2003/0064729 | A1 * | 4/2003 | Yamashita | H04W 72/02 455/451 |
| 2006/0284764 | A1 * | 12/2006 | Chintyan | 342/357.07 |
| 2010/0056165 | A1 * | 3/2010 | Kim et al. | 455/450 |
| 2010/0135223 | A1 * | 6/2010 | Tong | 370/329 |
| 2010/0151877 | A1 * | 6/2010 | Lee | H04W 72/048 455/453 |
| 2010/0159927 | A1 * | 6/2010 | Toda | H04W 48/16 455/435.2 |
| 2010/0177732 | A1 | 7/2010 | Watanabe et al. | |
| 2010/0232373 | A1 | 9/2010 | Nory et al. | |
| 2010/0248743 | A1 | 9/2010 | Kawasaki | |
| 2011/0013581 | A1 | 1/2011 | Lee et al. | |
| 2013/0287080 | A1 * | 10/2013 | Li et al. | 375/224 |

FOREIGN PATENT DOCUMENTS

EP    2528371 A1    11/2012

OTHER PUBLICATIONS

International Search Report and Written Opinion issued in International Patent Application No. PCT/US2013/050625 on Oct. 4, 2013.

\* cited by examiner

*Primary Examiner* — Benjamin H Elliott, IV
*Assistant Examiner* — Eric Nowlin
(74) *Attorney, Agent, or Firm* — Brundidge & Stanger, P.C.

(57) ABSTRACT

Technologies are generally described for a resource allocation scheme for wireless communications. In some examples, a radio base station configured to communicate with one or more mobile devices may include a speed detection unit configured to detect moving speeds of the one or more mobile devices relative to a position of the radio base station; a resource allocation unit configured to allocate frequencies of one or more subcarriers based on the moving speeds of the one or more mobile devices; and a radio communication unit configured to communicate with the one or more mobile devices using the allocated frequencies of the one or more subcarriers.

19 Claims, 11 Drawing Sheets

FIG. 3

| USER NO. | SPEED TO BASE STATION | RANK |
|---|---|---|
| USER 1 | 150 km/h | 1 |
| USER 2 | −60 km/h | 6 |
| USER 3 | −90 km/h | 7 |
| USER 4 | −140 km/h | 8 |
| USER 5 | 40 km/h | 4 |
| USER 6 | 100 km/h | 2 |
| USER 7 | −40 km/h | 5 |
| USER 8 | 80 km/h | 3 |

RESOURCE ALLOCATION IN WIRELESS COMMUNICATION

CROSS-REFERENCE TO RELATED APPLICATION

The present application is a U.S. National Stage filing under 35 U.S.C. §371 of International Application No. PCT/US13/50625, filed on Jul. 16, 2013.

BACKGROUND

In mobile communication systems, frequency-division modulation (FDM) may be employed to share radio resources among multiple users. For example, radio resources are divided into multiple subcarriers in frequency domain and this divided resources are allocated to a plurality of users. In some cases, radio resources may also be divided in time domain to efficiently share among multiple users. Further, in such systems, when the users move relative to a radio base station, a frequency bandwidth of a subcarrier allocated to the user may be shifted up or down due to the Doppler effect. As a result, the reception of a signal transmitted through the subcarrier at the radio base station may interfere with the reception of another signal transmitted through an adjacent subcarrier.

SUMMARY

In an example, a radio base station configured to communicate with one or more mobile devices may include a speed detection unit configured to detect moving speeds of the one or more mobile devices relative to a position of the radio base station; a resource allocation unit configured to allocate frequencies of one or more subcarriers based on the moving speeds of the one or more mobile devices; and a radio communication unit configured to communicate with the one or more mobile devices using the allocated frequencies of the one or more subcarriers.

In another example, a method for communicating with one or more mobile devices in a radio base station may include detecting, by a speed detection unit, moving speeds of the one or more mobile devices relative to a position of the radio base station; allocating, by a resource allocation unit, frequencies of one or more subcarriers based on the moving speeds of the one or more mobile devices; and communicating, by a radio communication unit, with the one or more mobile devices using the allocated frequencies of the one or more subcarriers.

In yet another example, a computer-readable storage medium may store a program for causing a processor configured to communicate with one or more mobile devices in a radio base station, the program including one or more instructions for detecting, by a speed detection unit, moving speeds of the one or more mobile devices relative to a position of the radio base station; allocating, by a resource allocation unit, frequencies of one or more subcarriers based on the moving speeds of the one or more mobile devices; and communicating, by a radio communication unit, with the one or more mobile devices using the allocated frequencies of the one or more subcarriers.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 3 shows a table listing moving speeds of one or more mobile devices relative to a radio base station, arranged in accordance with at least some embodiments described herein;

DETAILED DESCRIPTION

Figure 1:
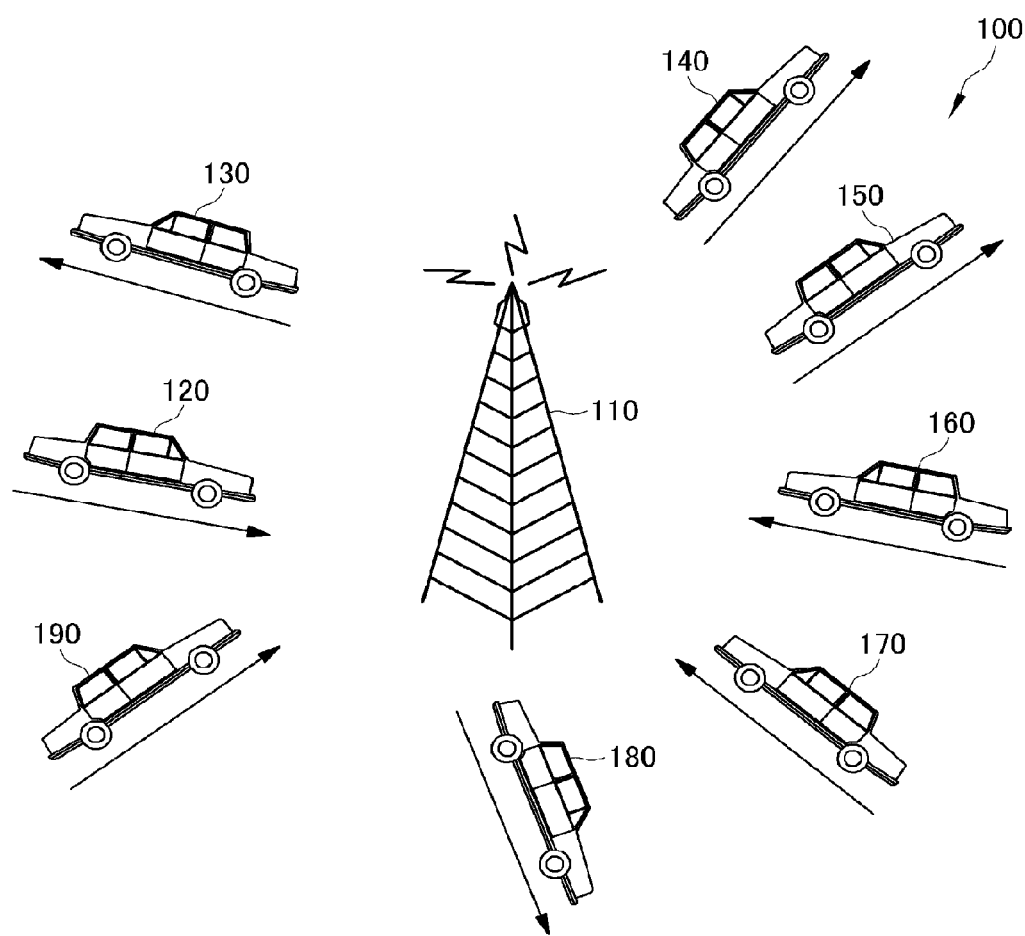
FIG. 1 schematically shows an illustrative example of a resource allocation scheme based on a moving speed of one or more mobile devices to a radio base station, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a wireless communication device such as a radio base station configured to communicate with one or more mobile devices while the one or more mobile devices are moving relative to the radio base station. Further, technologies are herein generally described for a resource allocation scheme for the wireless communication device.

In some examples, the radio base station may employ a resource allocation scheme to allocate frequencies of subcarriers for communication with one or more mobile devices depending on its movement or moving speed of the mobile devices relative to the radio base station. The radio base station may detect moving speeds of the one or more mobile devices relative to a position of the radio base station. Further, the radio base station may allocate frequencies of one or more subcarriers based on the moving speeds of the one or more mobile devices. The radio base station may communicate with the one or more mobile devices using the allocated frequencies of the one or more subcarriers.

In some examples, the radio base station may list the one or more mobile devices in order of the detected moving speeds of the one or more mobile devices. Further, the radio base station may allocate a higher frequency of subcarrier for use by a mobile device of the one or more mobile devices having a higher moving speed.

In some examples, the radio base station may detect the moving speeds of the one or more mobile devices by detecting a movement of each mobile device along a straight line between the mobile device and the radio base station. In some other examples, the radio base station may detect the moving speeds of the one or more mobile devices based on at least one of GPS (global positioning system) information and triangulation information. In some further examples, the radio base station may detect the moving speeds of the one or more mobile devices at regular time intervals.

In some examples, the radio base station may communicate with the one or more mobile devices using an Orthogonal Frequency Division Multiplex (OFDM) modulation method. In some other examples, the radio base station may allocate the frequencies of the one or more subcarriers for use in an uplink from the one or more mobile devices.

In some examples, the one or more mobile devices may be a vehicle-mounted mobile station.

FIG. 1 schematically shows an illustrative example of a resource allocation scheme based on a moving speed of one or more mobile devices to a radio base station, arranged in accordance with at least some embodiments described herein.

As depicted, in a wireless communication system 100, one or more mobile devices 120, 130, 140, 150, 160, 170, 180 and 190 (which may be referred to as "users" 1 to 8, respectively) may communicate with a radio base station 110 for communicating with each other or some other devices. In wireless communication system 100, mobile devices 120 to 190 may be stationary or move relative to radio base station 110 in certain directions (as indicated by arrows in FIG. 1).

In some embodiments, mobile devices 120 to 190 may be of any type of mobile electronic device, or any type of automobile or vehicle with such mobile electronic device mounted therein, where the mobile electronic device may be configured to store, retrieve, compute, transmit and/or receive data, including, for example, a smartphone, a mobile phone, a personal digital assistant (PDA), a tablet, a laptop computer, a desktop computer, etc. Also, mobile devices 120 to 190 may communicate with radio base station 110 via a wireless communication network such as, for example, a cellular network, a wireless wide area network (WAN), a wireless metropolitan area network (MAN), a wireless local area network (LAN), a wireless campus area network (CAN), etc. Although the below description describes that mobile devices 120 to 190 and/or radio base station 110 perform several operations and/or functions in accordance with at least some embodiments, those skilled in the art will recognize that computer programs or program modules hosted by the respective entities may perform the operations and/or functions described herein.

In some embodiments, mobile devices 120 to 190 and radio base station 110 may employ any suitable frequency-division multiplexing (FDM) method including OFDM modulation method, in which the entire radio resource (e.g., communication bandwidth) is divided into a series of at least partially overlapping or non-overlapping frequency subcarriers. Further, radio base station 110 may employ a resource allocation scheme to allocate frequencies of one or more subcarriers based on the moving speeds of one or more mobile devices 120 to 190.

In some embodiments, radio base station 110 may detect moving speeds of mobile devices 120 to 190 relative to a position of radio base station 110 and list mobile devices 120 to 190 in order of the detected moving speeds of mobile devices 120 to 190. Radio base station 110 may allocate a higher frequency of subcarrier for use by one of mobile devices 120 to 190 having a higher moving speed. Such resource allocation scheme may be employed to prevent interference between adjacent subcarriers allocated for communication with mobile devices 120 to 190, which may be caused by the Doppler effect, as discussed in detail below.

Figure 2:
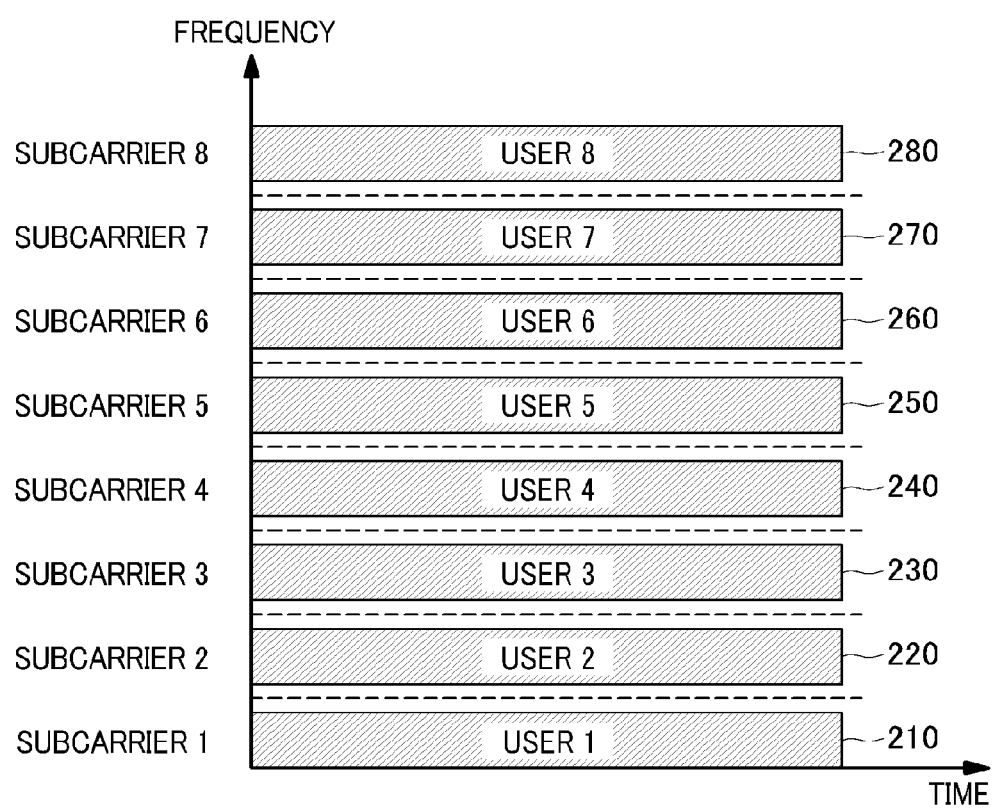
FIG. 2 shows a schematic chart illustrating subcarriers allocated to one or more mobile devices, arranged in accordance with at least some embodiments described herein.

FIG. 2 shows a schematic chart illustrating subcarriers allocated to one or more mobile devices, arranged in accordance with at least some embodiments described herein.

As illustrated in FIG. 2, wireless communication system 100 may divide a radio resource into subcarriers 1 to 8 which are allocated to users 1 to 8, respectively. This allocation of subcarriers may be performed for wireless communications in an uplink from mobile devices 120 to 190 to radio base station 110. If mobile devices 120 to 190 communicate with radio base station 110 via subcarriers 1 to 8 in a stationary state, mobile devices 120 to 190 may be able to fully utilize frequency bandwidths allocated for subcarriers 1 to 8. That is, the bandwidths occupied by the communications of mobile devices 120 to 190 (which are referred to as "occupied bandwidths" 210, 220, 230, 240, 250, 260, 270 and 280) may be substantially equal to the bandwidths allocated for the subcarriers 1 to 8 (which are referred to as "allocated bandwidths"). Further, adjacent ones of occupied bandwidths 210 to 280 may not overlap with each other and thus do not interfere with each other.

FIG. 3 shows a table listing moving speeds of one or more mobile devices relative to a radio base station, arranged in accordance with at least some embodiments described herein.

As depicted, mobile devices 120 to 190 may communicate with radio base station 110 while they are moving relative to radio base station 110 at certain speeds. For example, mobile device 120 (user 1) is approaching radio base station 110 at speed of 150 km/h (which is indicated as a positive value because it is approaching radio base station 110). Also, mobile device 130 (user 2) is receding from radio base station 110 at speed of 60 km/h (which is indicated as a negative value because it is receding from radio base station 110).

Figure 4:
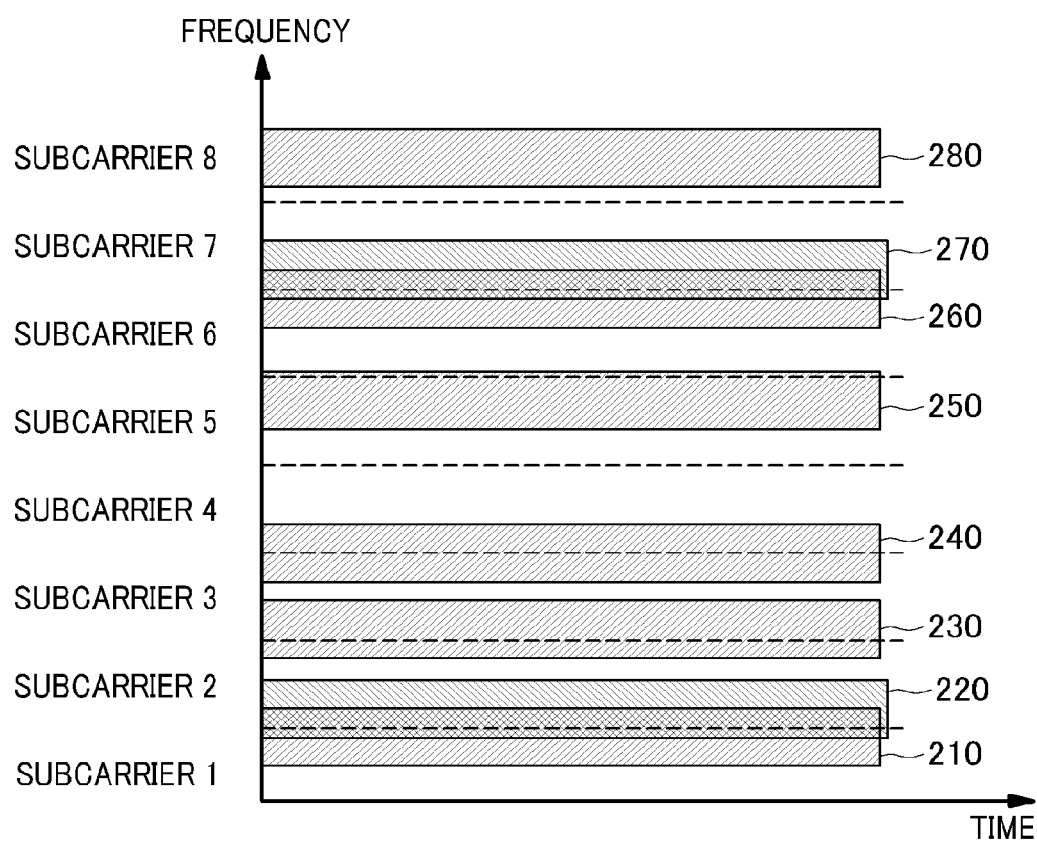
FIG. 4 shows a schematic chart illustrating the Doppler effect to subcarriers allocated to one or more mobile devices which may be caused by a movement of the one or more mobile devices relative to a radio base station, arranged in accordance with at least some embodiments described herein.

FIG. 4 shows a schematic chart illustrating the Doppler effect to subcarriers allocated to one or more mobile devices which may be caused by a movement of the one or more mobile devices relative to a radio base station, arranged in accordance with at least some embodiments described herein. More specifically, FIG. 4 shows occupied bandwidths 210 to 280 of users 1 to 8 moving at the speeds as described in FIG. 3.

As illustrated, the occupied bandwidths 210 to 280 are shifted up or down from its allocated bandwidths due to the Doppler effect. The Doppler effect refers to the change in frequency of a wave signal (e.g., wireless communication signal) for an observer (e.g., radio base station 110) moving relative to its source (e.g., mobile device 120). Specifically, when mobile device 120 transmits a wireless communication signal toward radio base station 110 while it is approaching radio base station 110, the received frequency at radio base station 110 may be higher compared to the emitted frequency at mobile device 120. As shown in FIG. 4, the occupied bandwidth 210 may be shifted up at its frequency. In the meantime, because mobile device 130 is receding from radio base station 110, the occupied bandwidth 220 may be shifted down at its frequency due to the Doppler effect. Thus, an upper part of the occupied bandwidth 210 may overlap with a lower part of the occupied bandwidth 220. As a result, a signal from user 1 may interfere with the reception of a signal from user 2 at radio base station 110. Likewise, a signal from user 2 may interfere with the reception of a signal from user 1 at radio base station 110.

Further, as illustrated in FIG. 4, if mobile device 170 (user 6) communicates with radio base station 110 while mobile device 170 is approaching radio base station 110, the occupied bandwidth 260 for user 6 may also get out of the allocated bandwidth due to the Doppler effect. On the other hand, if mobile device 180 (user 7) communicates with radio base station 110 while mobile device 180 is receding from radio base station 110, the occupied bandwidth 270 for user 7 may also get out of the allocated bandwidth due to the Doppler effect. As a result, a signal from user 6 may interfere with the reception of a signal from user 7 at radio base station 110.

In some embodiments, to avoid or reduce the interference between the occupied bandwidths of adjacent subcarriers, radio base station 110 and/or mobile devices 120 to 190 may employ a resource allocation scheme to allocate frequencies of subcarriers based on the moving speeds of mobile devices 120 to 190 relative to radio base station 110.

In some examples, radio base station 110 may detect the moving speeds of mobile devices 120 to 190 relative to a position of radio base station 110 and list mobile devices 120 to 190 in order of the detected moving speeds of mobile devices 120 to 190. For the example described in FIG. 3, radio base station 110 may list mobile devices 120, 170, 190, 160, 180, 130, 140 and 150 (users 1, 6, 8, 5, 7, 2, 3 and 4) in order of its moving speeds (e.g., in order of "ranks"). Radio base station 110 may then allocate a higher frequency of subcarrier for use by one of mobile devices 120 to 190 having a higher moving speed, such that subcarriers 8 to 1 are allocated to users 1, 6, 8, 5, 7, 2, 3 and 4, respectively.

Figure 5:
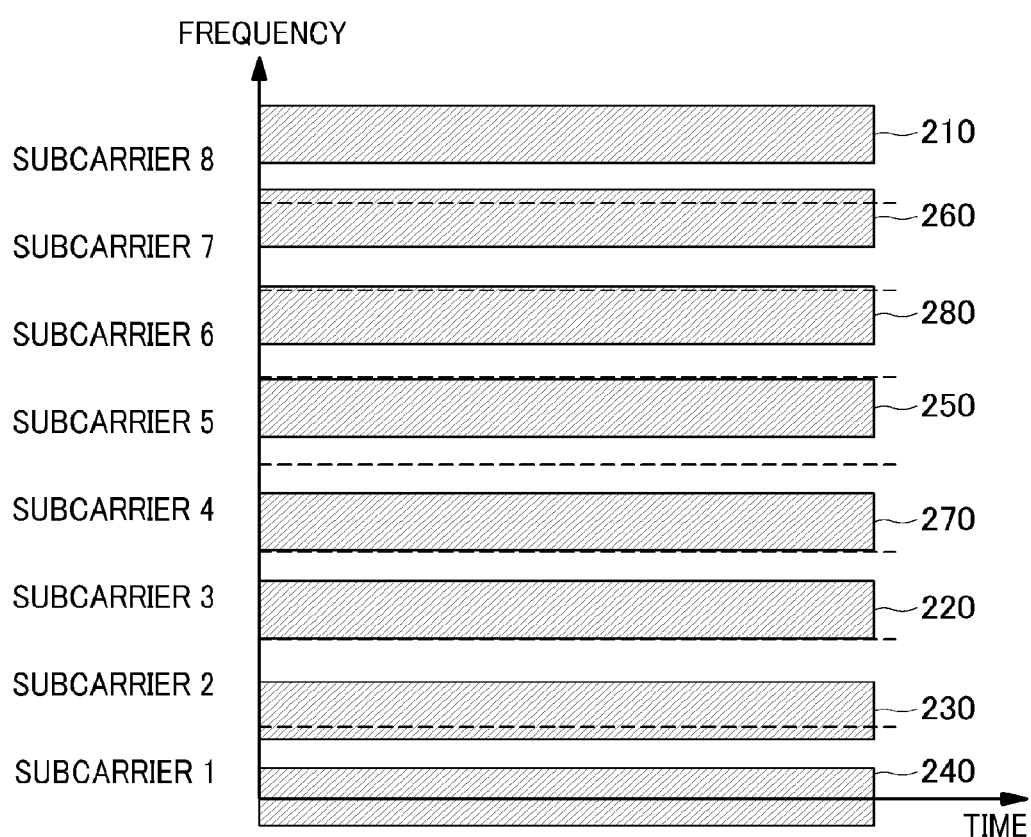
FIG. 5 show a schematic chart illustrating subcarriers allocated to one or more mobile devices that are adjusted according to a resource allocation scheme, arranged in accordance with at least some embodiments described herein.

FIG. 5 shows a schematic chart illustrating subcarriers allocated to one or more mobile devices that are adjusted according to a resource allocation scheme, arranged in accordance with at least some embodiments described herein.

As depicted, because a higher frequency of subcarrier is allocated for use by one of mobile devices 120 to 190 having a higher moving speed, the interference between adjacent subcarriers may be prevented. By way of example, but not limitation, as depicted in FIG. 5, subcarrier 8 of the first highest frequency is allocated to user 1 moving at the first highest speed, and subcarrier 7 of the second highest frequency is allocated to user 6 moving at the second highest speed. As a result, occupied bandwidth 210 of user 1 does not overlap with occupied bandwidth 260 of user 6. Similarly, the occupied bandwidths of other adjacent subcarriers do not overlap with each other, thereby preventing the interference between the adjacent subcarriers.

As discussed in detail below, the above-described resource allocation scheme for ordering the allocation of subcarriers based on the moving speeds of mobile devices 120 to 190 may be performed by a resource allocation unit or a resource allocator installed in radio base station 110. Further, the resource allocation scheme may be performed for an uplink communication between mobile devices 120 to 190 and radio base station 110.

Figure 6:
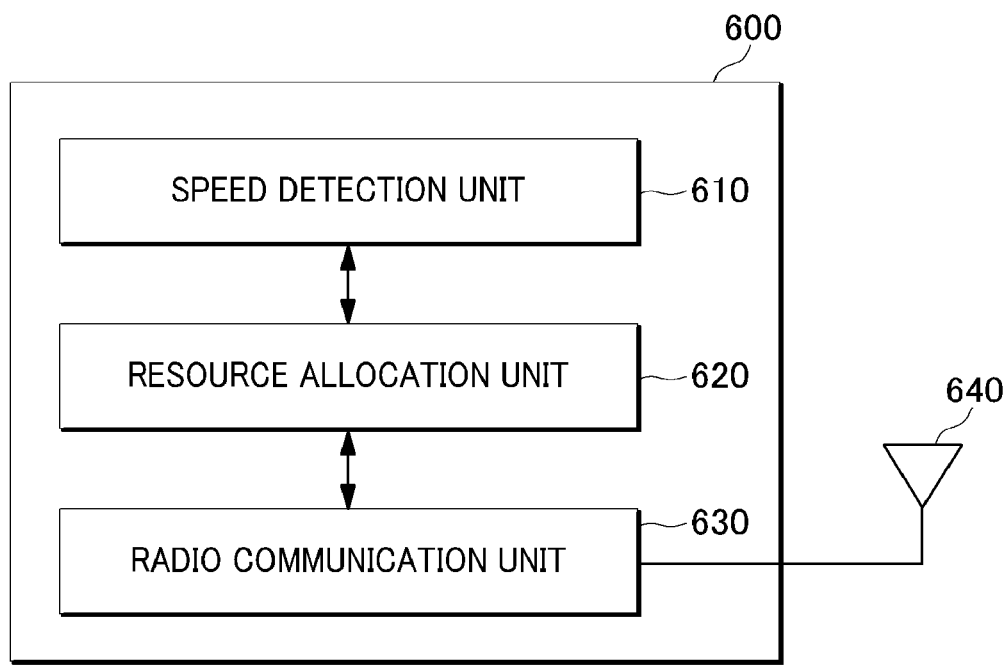
FIG. 6 shows a schematic block diagram illustrating an example architecture of a radio base station for implementing a resource allocation scheme, arranged in accordance with at least some embodiments described herein.

FIG. 6 shows a schematic block diagram illustrating an example architecture of a radio base station for implementing a resource allocation scheme, arranged in accordance with at least some embodiments described herein.

As depicted, a radio base station 600 may include a speed detection unit 610, a resource allocation unit 620, a radio communication unit 630, and an antenna 640. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Speed detection unit 610 may be configured to detect moving speeds of one or more mobile devices (e.g., mobile devices 120 to 190) relative to a position of a radio base station (e.g., radio base station 110).

In some embodiments, speed detection unit 610 may be configured to detect the moving speeds of the one or more mobile devices by detecting a movement of each mobile device along a straight line between the mobile device and the radio base station. In some other embodiments, speed detection unit 610 may be configured to detect the moving speeds of the one or more mobile devices based on at least one of GPS information and triangulation information, which may be received through antenna 640. In yet some other embodiments, speed detection unit 610 may be configured to detect the moving speeds of the one or more mobile devices at regular time intervals.

Resource allocation unit 620 may be configured to allocate frequencies of one or more subcarriers (e.g., subcarriers 1 to 8) based on the moving speeds of the one or more mobile devices.

In some embodiments, if speed detection unit 610 may list the one or more mobile devices in order of the detected moving speeds of the one or more mobile devices, resource allocation unit 620 may be further configured to allocate a higher frequency of subcarrier for use by a mobile device of the one or more mobile devices having a higher moving speed. In some examples, resource allocation unit 620 may allocate the frequencies of the one or more subcarriers for use in an uplink from the one or more mobile devices to the radio base station.

Radio communication unit 630 may be configured to communicate with the one or more mobile devices, through antenna 640, using the allocated frequencies of the one or more subcarriers. In some embodiments, radio communication unit 630 may be further configured to communicate with the one or more mobile devices using any suitable FDM method including an OFDM modulation method.

Antenna 640 may be configured to receive/transmit communication signals (e.g., GPS information and triangulation information) from/to the one or more mobile devices. The communication signals may be generated from radio communication unit 630.

In some embodiments, the above configuration of radio base station 600 may be implemented in radio base station 110.

Figure 7:
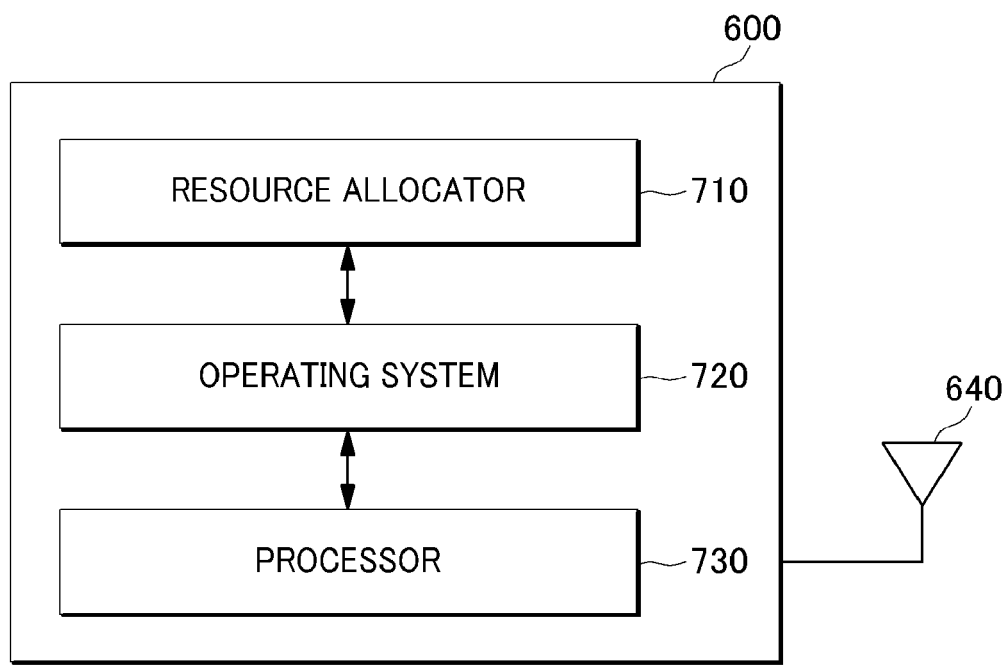
FIG. 7 shows a schematic block diagram illustrating another example architecture of a radio base station for implementing a resource allocation scheme, arranged in accordance with at least some embodiments described herein.

FIG. 7 shows a schematic block diagram illustrating another example architecture of a radio base station for implementing a resource allocation scheme, arranged in accordance with at least some embodiments described herein.

As depicted, radio base station 600 may include a resource allocator 710, an operating system 720, and a processor 730. Resource allocator 710 may be an application adapted to operate on operating system 720 such that the resource allocation scheme as described herein may be provided. Operating system 720 may allow resource allocator 710 to manipulate processor 730 to implement the resource allocation scheme as described herein.

Figure 8:
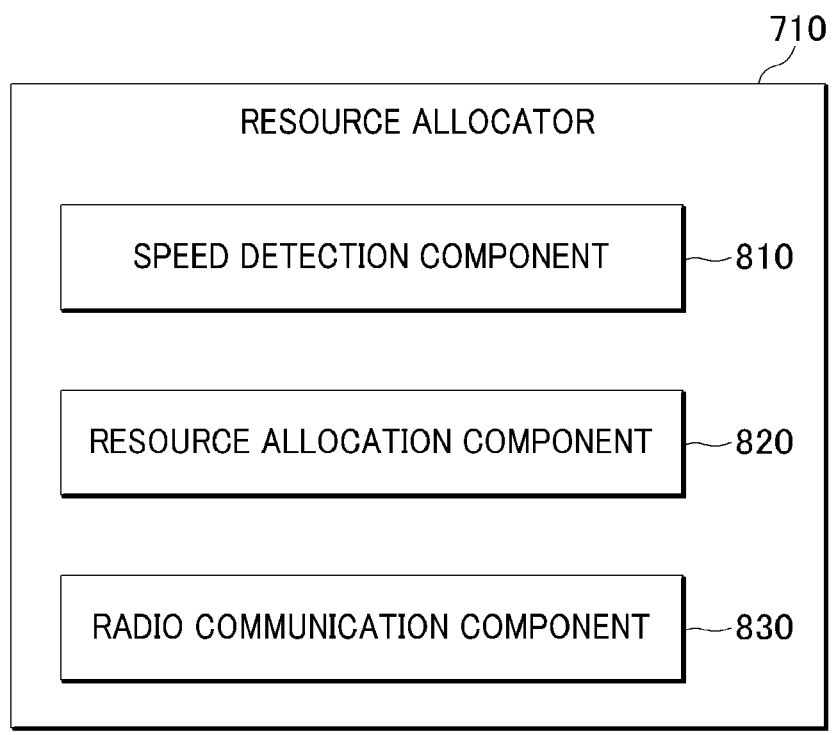
FIG. 8 shows a schematic block diagram illustrating an example architecture of a resource allocator for implementing a resource allocation scheme, arranged in accordance with at least some embodiments described herein.

FIG. 8 shows a schematic block diagram illustrating an example architecture of a resource allocator for implementing a resource allocation scheme, arranged in accordance with at least some embodiments described herein.

As depicted, resource allocator 710 may include a speed detection component 810, a resource allocation component 820, and a radio communication component 830.

Speed detection component 810 may be adapted to detect moving speeds of one or more mobile devices (e.g., mobile devices 120 to 190) relative to a position of a radio base station (e.g., radio base station 110).

In some embodiments, speed detection component 810 may detect the moving speeds of the one or more mobile devices by detecting a movement of each mobile device along a straight line between the mobile device and the radio base station. In some other embodiments, speed detection component 810 may detect the moving speeds of the one or more mobile devices based on at least one of GPS information and triangulation information. In yet some other embodiments, speed detection component 810 may detect the moving speeds of the one or more mobile devices at regular time intervals.

Resource allocation component 820 may be adapted to allocate frequencies of one or more subcarriers (e.g., subcarriers 1 to 8) based on the moving speeds of the one or more mobile devices.

In some embodiments, if speed detection component 810 may list the one or more mobile devices in order of the detected moving speeds of the one or more mobile devices, resource allocation component 820 may allocate a higher frequency of subcarrier for use by a mobile device of the one or more mobile devices having a higher moving speed. In some examples, resource allocation component 820 may allocate the frequencies of the one or more subcarriers for use in an uplink from the one or more mobile devices to the radio base station.

Radio communication component 830 may be adapted to communicate with the one or more mobile devices using the allocated frequencies of the one or more subcarriers. In some embodiments, radio communication component 830 may communicate with the one or more mobile devices using any suitable FDM method including an OFDM modulation method.

Figure 9:
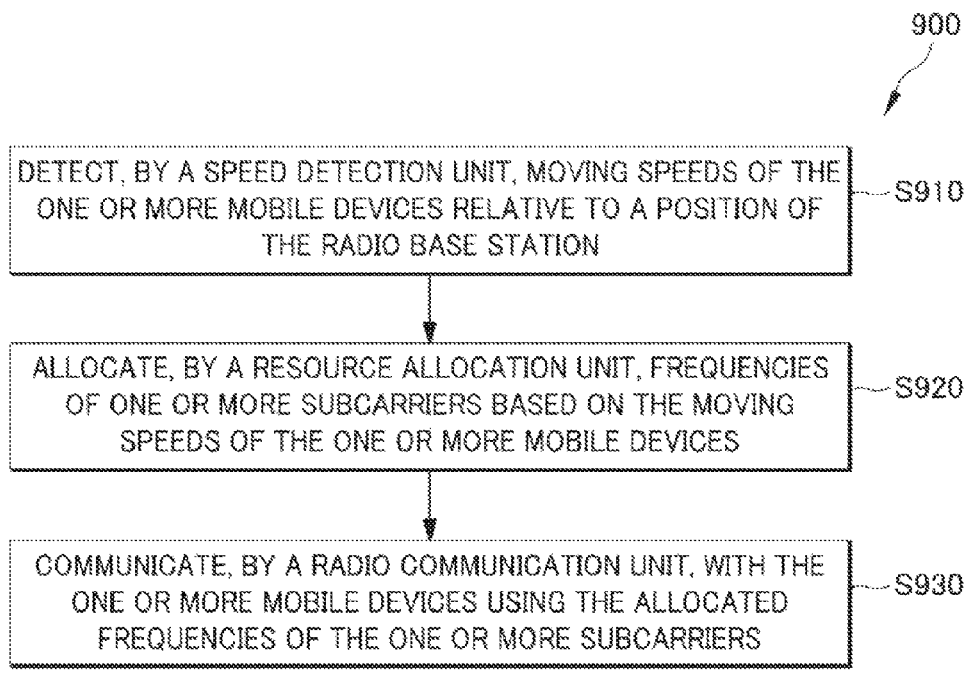
FIG. 9 shows an example flow diagram of a process for a radio base station for implementing a resource allocation scheme, arranged in accordance with at least some embodiments described herein.

FIG. 9 shows an example flow diagram of a process for a radio base station for implementing a resource allocation scheme, arranged in accordance with at least some embodiments described herein.

Process 900 may be implemented in a radio base station such as radio base station 600 including speed detection unit 610, resource allocation unit 620, and radio communication unit 630. Process 900 may also be implemented by computer programs or program modules that are adapted to provide the resource allocation scheme and hosted by a radio base station, such as resource allocator 710 including speed detection component 810, resource allocation component 820, and radio communication component 830. Process 900 may include one or more operations, actions, or functions as illustrated by one or more blocks S910, S920 and/or S930. Although illustrated as discrete blocks, various blocks may be divided into additional blocks, combined into fewer blocks, or eliminated, depending on the desired implementation. Processing may begin at block S910.

At block S910 (Detect, by a Speed Detection Unit, Moving Speeds of the One or More Mobile Devices Relative to a Position of the Radio Base Station), radio base station 110 or 600 (e.g., speed detection unit 610) and/or resource allocator 710 (e.g., speed detection component 810) may detect moving speeds of the one or more mobile devices relative to a position of the radio base station.

In some embodiments, radio base station 110 or 600 and/or resource allocator 710 may detect the moving speeds of the one or more mobile devices by detecting a movement of each mobile device along a straight line between the mobile device and the radio base station. In some other embodiments, radio base station 110 or 600 and/or resource allocator 710 may detect the moving speeds of the one or more mobile devices based on at least one of GPS information and triangulation information. In yet some other embodiments, radio base station 110 or 600 and/or resource allocator 710 may detect the moving speeds of the one or more mobile devices at regular time intervals. Processing may continue from block S910 to block S920.

At block S920 (Allocate, by a Resource Allocation Unit, Frequencies of One or More Subcarriers based on the Moving Speeds of the One or More Mobile Devices), radio base station 110 or 600 (e.g., resource allocation unit 620) and/or resource allocator 710 (e.g., resource allocation component 820) may allocate frequencies of one or more subcarriers (e.g., subcarriers 1 to 8) based on the moving speeds of the one or more mobile devices.

In some embodiments, if the one or more mobile devices may be listed in order of the detected moving speeds of the one or more mobile devices, radio base station 110 or 600 and/or resource allocator 710 may allocate a higher frequency of subcarrier for use by a mobile device of the one or more mobile devices having a higher moving speed. In some examples, radio base station 110 or 600 and/or resource allocator 710 may allocate the frequencies of the one or more subcarriers for use in an uplink from the one or more mobile devices to the radio base station. Processing may continue from block S920 to block S930.

At block S930 (Communicate, by a Radio Communication Unit, with the One or More Mobile Devices Using the Allocated Frequencies of the One or More Subcarriers), radio base station 110 or 600 (e.g., radio communication unit 630) and/or resource allocator 710 (e.g., radio communication component 830) may communicate with the one or more mobile devices using the allocated frequencies of the one or more subcarriers. In some embodiments, radio base station 110 or 600 and/or resource allocator 710 may communicate with the one or more mobile devices using any suitable FDM method including an OFDM modulation method.

As such, radio base station 110 or 600 and/or resource allocator 710 may prevent the occupied bandwidths for subcarriers from invading the adjacent occupied bandwidths even in case that the occupied bandwidths are shifted up/down due to the Doppler effect when the mobile devices are moving relative to radio base station 110 or 600 and/or resource allocator 710.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 10:
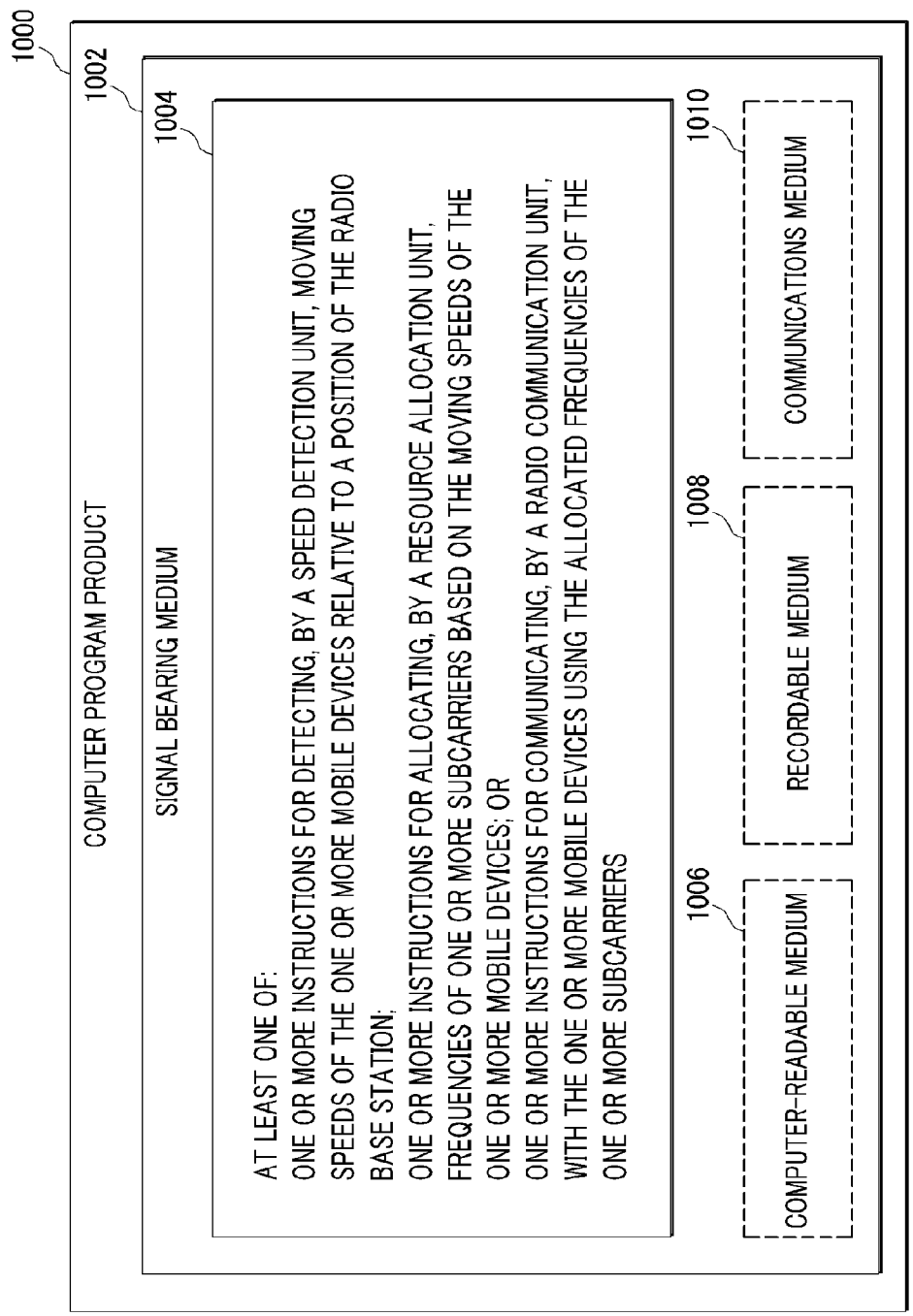
FIG. 10 illustrates an example computer program product that may be utilized to implement a resource allocation scheme, arranged in accordance with at least some embodiments described herein.

FIG. 10 illustrates an example computer program product that may be utilized to implement a resource allocation scheme, arranged in accordance with at least some embodiments described herein.

Computer program product 1000 may be hosted by a radio base station, such as radio base station 110 or 600 and/or resource allocator 710. As depicted, computer program product 1000 may include a signal bearing medium 1002. Signal bearing medium 1002 may include one or more instructions 1004 that, when executed by, for example, a processor, may provide the functionality described above with respect to FIGS. 1-9. By way of example, instructions 1004 may include: one or more instructions for detecting, by a speed detection unit, moving speeds of the one or more mobile devices relative to a position of the radio base station; one or more instructions for allocating, by a resource allocation unit, frequencies of one or more subcarriers based on the moving speeds of the one or more mobile devices; or one or more instructions for communicating, by a radio communication unit, with the one or more mobile devices using the allocated frequencies of the one or more subcarriers. Thus, for example, referring to FIGS. 1-8, radio base station 110 or 600 and/or resource allocator 710 may undertake one or more of the blocks shown in FIG. 9 in response to instructions 1004.

In some implementations, signal bearing medium 1002 may encompass a computer-readable medium 1006, such as, but not limited to, a hard disk drive, a CD, a DVD, a digital tape, memory, etc. In some implementations, signal bearing medium 1002 may encompass a recordable medium 1008, such as, but not limited to, memory, read/write (R/W) CDs, R/W DVDs, etc. In some implementations, signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, computer program product 1000 may be conveyed to one or more modules of radio base station 110 or 600 and/or resource allocator 710 by an RF signal bearing medium 1002, where the signal bearing medium 1002 is conveyed by a wireless communications medium 1010 (e.g., a wireless communications medium conforming with the IEEE 802.11 standard).

Figure 11:
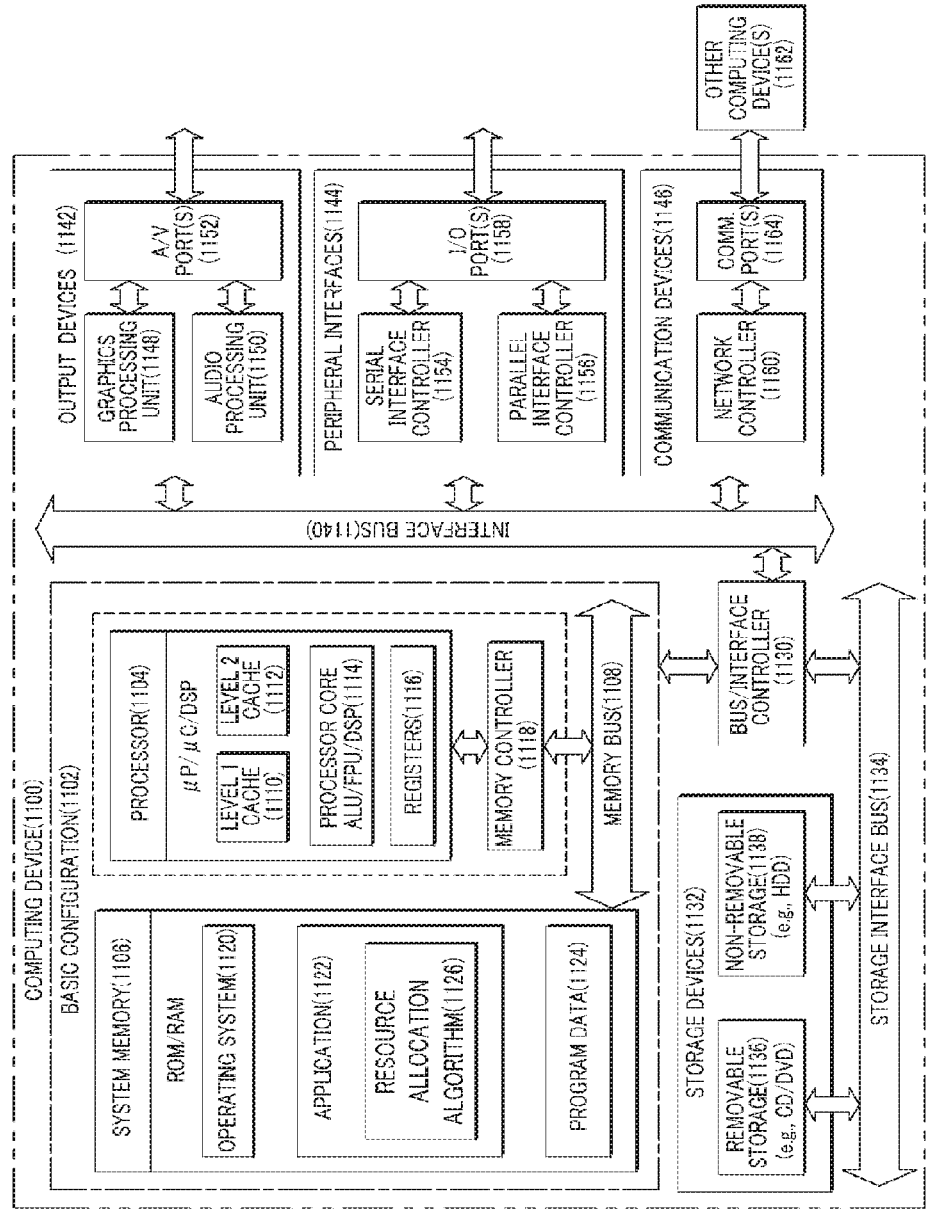
FIG. 11 is a block diagram illustrating an example computing device that may be utilized to implement a resource allocation scheme, arranged in accordance with at least some embodiments described herein.

FIG. 11 is a block diagram illustrating an example computing device that may be utilized to implement a resource allocation scheme, arranged in accordance with at least some embodiments described herein.

In a very basic configuration 1102, computing device 1100 typically includes one or more processors 1104 and a system memory 1106. A memory bus 1108 may be used for communicating between processor 1104 and system memory 1106.

Depending on the desired configuration, processor 1104 may be of any type including but not limited to a microprocessor (µP), a microcontroller (µC), a digital signal processor (DSP), or any combination thereof. Processor 1104 may include one or more levels of caching, such as a level one cache 1110 and a level two cache 1112, a processor core 1114, and registers 1116. An example processor core 1114 may include an arithmetic logic unit (ALU), a floating point unit (FPU), a digital signal processing core (DSP Core), or any combination thereof. An example memory controller 1118 may also be used with processor 1104, or in some implementations memory controller 1118 may be an internal part of processor 1104.

Depending on the desired configuration, system memory 1106 may be of any type including but not limited to volatile memory (such as RAM), nonvolatile memory (such as ROM, flash memory, etc.) or any combination thereof. System memory 1106 may include an operating system 1120, one or more applications 1122, and program data 1124.

Application 1122 may include a resource allocation algorithm 1126 that may be arranged to perform the functions as described herein including the actions described with respect to the radio base station 110 or 600 architecture as shown in FIGS. 2-8 or including the actions described with respect to the flow charts shown in FIG. 9. Program data 1124 may include any data that may be useful for providing the resource allocation scheme as is described herein. In some examples, application 1122 may be arranged to operate with program data 1124 on an operating system 1120 such that the resource allocation scheme as described herein may be provided.

Computing device 1100 may have additional features or functionality, and additional interfaces to facilitate communications between basic configuration 1102 and any required devices and interfaces. For example, a bus/interface controller 1130 may be used to facilitate communications between basic configuration 1102 and one or more data storage devices 1132 via a storage interface bus 1134. Data storage devices 1132 may be removable storage devices 1136, non-removable storage devices 1138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1106, removable storage devices 1136 and non-removable storage devices 1138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100.

Computing device 1100 may also include an interface bus 1140 for facilitating communication from various interface devices (e.g., output devices 1142, peripheral interfaces 1144, and communication devices 1146) to basic configuration 1102 via bus/interface controller 1130. Example output devices 1142 include a graphics processing unit 1148 and an audio processing unit 1150, which may be configured to communicate to various external devices such as a display or speakers via one or more A/V ports 1152. Example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. An example communication device 1146 includes a network controller 1160, which may be arranged to facilitate communications with one or more other computing devices 1162 over a network communication link via one or more communication ports 1164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A radio base station comprising:
    a processor; and
    a memory, the memory storing a resource allocator that comprises components that are executable upon operation of the processor, the components comprising:
    a speed detection unit configured to detect moving speeds of a plurality of mobile devices relative to a position of the radio base station, wherein the speed detection unit is further configured to list the plurality of mobile devices in order of the detected moving speeds of the plurality of mobile devices,
    a resource allocation unit configured to allocate frequencies of one or more subcarriers to respective ones of the plurality of mobile devices by allocating a subcarrier of a descending order of frequencies to each of the plurality of mobile devices based upon a descending order of the detected moving speeds of the plurality of mobile devices, and
    a radio communication unit configured to communicate with the plurality of mobile devices using the allocated frequencies of the one or more subcarriers.

2. The radio base station of claim 1, wherein the speed detection unit is further configured to detect the moving speeds of the plurality of mobile devices by detecting a movement of each mobile device along a straight line between the mobile device and the radio base station.

3. The radio base station of claim 1, wherein the radio communication unit is further configured to communicate with the plurality of mobile devices using an Orthogonal Frequency Division Multiplex (OFDM) modulation method.

4. The radio base station of claim 1, wherein at least one mobile device of the plurality of mobile devices is a vehicle-mounted mobile station.

5. The radio base station of claim 1, wherein the resource allocation unit is further configured to allocate the frequencies of the one or more subcarriers for use in an uplink from the plurality of mobile devices.

6. The radio base station of claim 1, wherein the speed detection unit is further configured to detect the moving speeds of the plurality of mobile devices based on at least one of GPS (global positioning system) information and triangulation information.

7. The radio base station of claim 1, wherein the speed detection unit is further configured to detect the moving speeds of the plurality of mobile devices at regular time intervals.

8. A method for communicating with plurality of mobile devices in a radio base station, the radio base station comprising:
    a processor, and
    a memory, the memory comprising a resource allocator that comprises components including a speed detection unit, a resource allocation unit, and a radio communication unit, wherein the components, upon execution by the processor, perform the method comprising:
    detecting, by the speed detection unit, moving speeds of the plurality of mobile devices relative to a position of the radio base station;
    listing, by the speed detection unit, the plurality of mobile devices in order of the detected moving speeds of the plurality of mobile devices;
    allocating, by the resource allocation unit, frequencies of one or more subcarriers to respective ones of the plurality of mobile devices by allocating a subcarrier of a descending order of frequencies to each of the plurality of mobile devices based upon a descending order of the detected moving speeds of the plurality of mobile devices; and
    communicating, by the radio communication unit, with the plurality of mobile devices using the allocated frequencies of the one or more subcarriers.

9. The method of claim 8, wherein detecting the moving speeds of the plurality of mobile devices comprises detecting, by the speed detection unit, the moving speeds of the plurality of mobile devices by detecting a movement of each mobile device along a straight line between the mobile device and the radio base station.

10. The method of claim 8, wherein communicating with the plurality of mobile devices comprises communicating, by the radio communication unit, with the plurality of mobile devices using an OFDM modulation method.

11. The method of claim 8, wherein allocating the frequencies of the one or more subcarriers comprises allocating, by the resource allocation unit, the frequencies of the one or more subcarriers for use in an uplink from the plurality of mobile devices.

12. The method of claim 8, wherein detecting the moving speeds of the plurality of mobile devices comprises detecting, by the speed detection unit, the moving speeds of the plurality of mobile devices based on at least one of GPS information and triangulation information.

13. The method of claim 8, wherein detecting the moving speeds of the plurality of mobile devices comprises detecting, by the speed detection unit, the moving speeds of the plurality of mobile devices at regular time intervals.

14. A radio base station comprising a non-transitory computer-readable storage medium which stores an executable program for causing a processor to enable the radio base station to communicate with a plurality of mobile devices, the program comprising a resource allocator that comprises components including a speed detection unit, a resource allocation unit, and a radio communication unit, and the executable program executing one or more instructions for:
 detecting, by the speed detection unit, moving speeds of the plurality of mobile devices relative to a position of the radio base station;
 listing, by the speed detection unit, the plurality of mobile devices in order of the detected moving speeds of the plurality of mobile devices;
 allocating, by the resource allocation unit, frequencies of one or more subcarriers to respective ones of the plurality of mobile devices by allocating a subcarrier of a descending order of frequencies to each of the plurality of mobile devices based upon a descending order of the detected moving speeds of the plurality of mobile devices; and
 communicating, by the radio communication unit, with the plurality of mobile devices using the allocated frequencies of the one or more subcarriers.

15. The medium of claim 14, wherein detecting the moving speeds of the plurality of mobile devices comprises detecting, by the speed detection unit, the moving speeds of the plurality of mobile devices by detecting a movement of each mobile device along a straight line between the mobile device and the radio base station.

16. The medium of claim 14, wherein communicating with the plurality of mobile devices comprises communicating, by the radio communication unit, with the plurality of mobile devices using an OFDM modulation method.

17. The medium of claim 14, wherein allocating the frequencies of one or more subcarriers comprises allocating, by the resource allocation unit, the frequencies of the one or more subcarriers for use in an uplink from the plurality of mobile devices.

18. The medium of claim 14, wherein detecting the moving speeds of the plurality of mobile devices comprises detecting, by the speed detection unit, the moving speeds of the plurality of mobile devices based on at least one of GPS information and triangulation information.

19. The medium of claim 14, wherein detecting the moving speeds of the plurality of mobile devices comprises detecting, by the speed detection unit, the moving speeds of the plurality of mobile devices at regular time intervals.

* * * * *

UNITED STATES PATENT AND TRADEMARK OFFICE
CERTIFICATE OF CORRECTION

PATENT NO. : 9,439,200 B2  
APPLICATION NO. : 14/130018  
DATED : September 6, 2016  
INVENTOR(S) : Lee Page 1 of 1

It is certified that error appears in the above-identified patent and that said Letters Patent is hereby corrected as shown below:

In the Specification

In Column 1, Line 8, delete "§371" and insert -- § 371 --, therefor.

In the Claims

In Column 13, Line 44, in Claim 1, delete "station" and insert -- station, --, therefor.

Signed and Sealed this  
Twenty-first Day of February, 2017

Michelle K. Lee  
*Director of the United States Patent and Trademark Office*